Patented Oct. 26, 1937

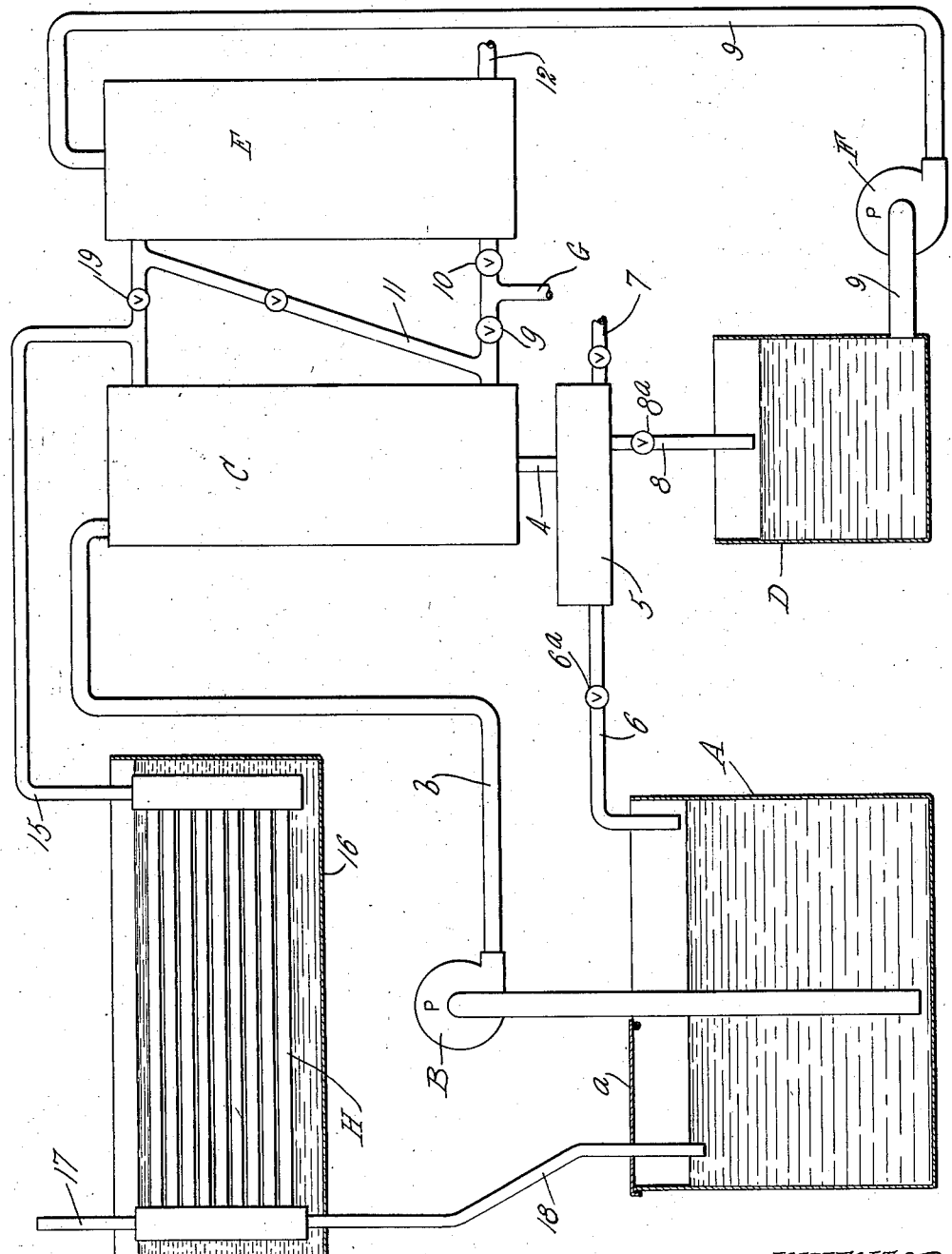

2,096,855

UNITED STATES PATENT OFFICE 2,096,855

MANUFACTURE OF FERRIC CHLORIDE

Edward Thorndike Ladd, Lewiston Heights, N. Y., assignor to Innis, Speiden & Co., a corporation of Delaware Application July 27, 1934, Serial No. 737,291

6 Claims. (Cl. 23—87)

This invention relates to the manufacture of ferric chloride solutions of high concentration.

The objects of this invention are to provide a process in which a ferric chloride solution is initially employed to act upon iron and in which the resulting solution is then acted upon by chlorine; also to provide a process of this kind which may be carried on continuously by the addition of iron, water and chlorine; also to provide a process which can be economically carried out in a simple and compact apparatus of large capacity; also to provide a process by which concentrations of 60 per cent or higher may be obtained without evaporation at any stage of the process; also to improve processes and apparatus of this kind in other respects hereinafter specified.

The accompanying drawing is a diagrammatic view of one form of apparatus that may be employed in the carrying out of my invention.

Briefly stated, my process includes the step of reacting upon metallic iron with a solution containing ferric chloride. This results in a reaction upon the iron by the ferric chloride and the formation of a larger quantity of ferrous chloride. The resulting solution is then subjected to the action of chlorine gas which converts the ferrous chloride in the solution into ferric chloride. The solution, which consequently contains a larger quantity of ferric chloride than the starting solution, may be again passed into contact with the iron, whereupon the process is repeated with a corresponding increase in the quantity of ferric chloride in the solutions. This repetition may be continued until the desired quantity of ferric chloride has been formed or until the solution has acquired the desired concentration, whereupon the solution may be drawn off and permitted to cool. At certain concentrations, this cooling will result in a crystallization of the hydrated ferric chloride. At other concentrations, the solution will remain in liquid form. By this process, concentrations of 60 per cent or higher may be obtained without evaporation at any stage of the process.

The process may be carried on for longer periods of time by continuing the same and adding water thereto. It is also possible to make the process a continuous one by passing only a portion of the solution which has been acted upon by chlorine to contact with the iron, while another portion of the solution is drawn off, and if desired or necessary, the portion of the solution which has been drawn off may be further subjected to the action of chlorine gas without again subjecting it to contact with iron, to insure a substantially complete conversion of all ferrous chloride into ferric chloride, and after such treatment, this part of the solution may be withdrawn from the process for cooling.

The accompanying drawing illustrates one type of apparatus that may be employed in the carrying out of my improved process, but it will be understood that it is not intended to limit the invention to the particular type of apparatus illustrated.

In the drawing, A represents a tank or container made of suitable material or having a lining which is not acted upon by ferrous or ferric chloride, and this tank preferably has an opening in the top thereof which may be closed by a lid $a$ or the like, and through which metallic iron may be placed into the tank. Scrap sheet iron or steel is very desirable for this purpose, in that it affords a large surface upon which the reaction may take place, but iron of other form may be used. In starting the apparatus, a small quantity of solution containing ferric chloride is also placed into the tank A and reacts with iron in the tank to form ferrous chloride, the ferric chloride giving off some of its chlorine which reacts with iron to produce a larger molecular quantity of ferrous chloride than the quantity of ferric chloride originally in the solution.

After this reaction, the resulting solution is acted upon by chlorine gas. This may be done in any suitable or desired manner, and if desired, the reaction may be carried on within the tank A. I have found, however, that I can produce a more effective reaction between the chlorine and the ferrous chloride solution by withdrawing the solution from the tank A and subjecting it to the action of chlorine in a separate chamber, which is preferably closed to prevent the escape of chlorine gas. In the particular apparatus disclosed, the solution after reacting with the iron in the tank A, is withdrawn from the tank by means of a pump B and discharged through a conduit $b$ to the top of a scrubbing tower C, which may be of any usual or suitable construction, being preferably packed with suitable material not acted upon by the ferrous or ferric chloride solutions, nor by the chlorine gas and so arranged that the maximum contact is made between the solution and the chlorine gas.

The chlorine gas is admitted to the scrubbing tower C from any suitable source through a conduit G passing through a valve $g$ into the lower portion of the tower C. The chlorine gas converts ferrous chloride into ferric chloride and the resulting solution collecting at the bottom of the tower may be passed through a discharge conduit 4 into a trough 5 from which it may flow by gravity through a conduit 6 controlled by valve 6A back into the tank A. The solution thus contains a larger quantity of ferric chloride than that with which the process was started, and again reacts with the iron in the tank A to form ferrous chloride, and is then again passed through the scrubbing tower C. This operation may be continued as long as desired.

If no water is added, the solution will quickly increase in concentration, even as high as 60 per cent or more, and consequently, if it is desired to carry on the process for a still longer period of time to make larger quantities of ferric chloride solutions, water can be added from time to time to reduce the concentration to prevent the ferrous or ferric chloride from crystallizing in the apparatus. The reaction of ferric chloride with iron as well as the reaction of the chlorine with ferrous chloride results in the generation of heat sufficient to keep the liquor from crystallizing within the apparatus so long as extremely high concentrations be avoided by adding water.

As soon as approximately the desired quantity of ferric chloride solution has been produced, further addition of water is stopped, and the concentration of the solution will then be increased by the further reactions within the tank A and scrubbing tower C. The solution, or a portion thereof may then be withdrawn from the apparatus through a conduit 7 into a suitable container (not shown), in which the solution is permitted to cool, and in which the ferric chloride will crystallize if the concentration of the same is such as to permit of crystallization. Water may also be added to the system mainly through the medium of the water vapor contained in the chlorine gas if chlorine is used as it comes directly from electrolytic cells.

Instead of operating the apparatus by a batch process, as has already been described, it is possible to operate the process continuously, after the solution has attained the strong concentration. For this purpose, I have illustrated a second tank or container D connected by means of a conduit 8, having a controlling valve 8A, with the trough 5, from which trough a portion of the solution may be conducted into the tank D, while the greater part of the solution returns to the tank A. I have also provided a second scrubbing tower E, which may be similar in construction to the tower C, and the solution from the tank D may be pumped through a conduit 9 by means of a pump F to the upper portion of the scrubbing tower E.

Chlorine gas may be admitted to the lower portion of the scrubbing tower E by opening a valve 10 leading to the chlorine conduit G. Chlorine gas, consequently, will act for a second time upon the solution while passing through the tower E, for the purpose of converting any ferrous chloride, which may be left in the solution, into ferric chloride. In cases where the scrubbing tower C is provided with sufficient chlorine to convert substantially all of the ferrous chloride into ferric chloride, the use of the second tower E may be dispensed with and the solution from the tank D may be discharged directly into a cooling vessel. I have found, however, that the apparatus may be operated somewhat more efficiently and the escape of chlorine gas into the air may be avoided by supplying the scrubbing tower C with a quantity of chlorine slightly insufficient to convert all of the ferrous chloride into ferric chloride, and by supplying the scrubbing tower E with an excess of chlorine gas beyond that required to convert ferrous chloride supplied to the tower E into ferric chloride.

To accomplish this result, I provide an additional conduit 11 leading from the upper portion of the scrubbing tower E to the lower portion of the tower C so that the excess chlorine from the tower E may be discharged into the bottom of the tower C. In this way, I can be assured of having ample chlorine in the tower E to convert all ferrous chloride into ferric chloride without waste of chlorine. The finished solution from the lower end of the scrubbing tower E may be discharged through a conduit 12 to a cooling vessel (not shown), and this solution contains little or no ferrous chloride and has little or no acidity.

In order to make the process thoroughly efficient, all vapors collecting in the upper portion of the scrubbing tower C may be discharged through a conduit 15 to a condenser H of any suitable kind. This condenser may consist of tubing through which the vapors and gases pass, and cooling of the tubing may be effected in any desired manner, for example, by means of water contained in a tank 16 in which the condenser may be located. Air may be used as a cooling medium, if desired. The condenser may be provided with a discharge duct 17 for any non-condensible gases, and another discharge duct 18 for the condensate, the duct 18 leading back to the tank A. In this condenser, water vapor, small quantities of hydrochloric acid and other condensible vapors may be liquefied and returned to the process. The conduit 15 may also be connected with the upper portion of the scrubbing tower E by opening a valve 19, if it is desired to withdraw condensible vapors from the tower E. It will, of course, be obvious that vapors from any other part of the apparatus may be condensed and the condensate returned to the apparatus.

By using the process described, it is possible without evaporation to make ferric chloride of much stronger concentrations than are usually found commercially on the market. In other words, a product may be made which remains a solution at normal temperatures, another product which contains approximately sixty percent ferric chloride and is, under normal conditions, solid. Further, solutions may be made in the vicinity of sixty-six percent ferric chloride which solutions are fluid at normal temperatures, and lastly, ferric chloride may be made in concentrations over and above sixty-six percent ferric chloride. These concentrations are in the form of solid or crystalline material under normal conditions.

Since ferrous chloride of concentrations from about 45% to 50% crystallizes at the temperatures normally existing in the process, and since ferrous chloride of 50% concentration or less could not be converted by chlorination into a ferric chloride solution of about 60% or more, the fact that ferric chloride solutions of the high concentrations herein specified can be produced by this process without the step of concentration by evaporation is probably due to the fact that during the continuous ciculation of the solution in an endless path including the chlorinator C and the tank A which contains iron, only a part of the ferric chloride solution is converted into ferrous chloride in the tank A, since the chemical reaction in the tank A is relatively slow.

The process and apparatus described have the advantages that the two reactions take place in separate containers or in separated portions of the same container. Consequently, no chlorine is admitted into the tank A, so that the tank may be opened at any time to admit iron or water without danger from or loss of chlorine gas. This permits the apparatus to be operated continuously, since iron may be added to the tank A at any time without interrupting the process. Since the iron in the tank is submerged in the solution, the solution containing ferric chloride comes into intimate and steady contact with the iron so that a very efficient reaction results. The process also has the advantage that chlorine gas does not come into contact with the iron and that no hydrochloric acid is used in the reaction.

The concentration of the liquid in the system may be very easily and accurately controlled by the length of time of treatment of the liquid and by the control of the supply of water to the system. The process also generates its own heat, which keeps the solution from crystallizing within the apparatus. The operator can take samples from the trough 5 and test the specific gravity of the same at any time and control the supply of water accordingly.

The process has the further advantage that it may be carried on with the use of chlorine gas coming directly from the electrolytic cells, so that the removal of water from the chlorine gas is not necessary. When such gas is used, very little, if any, water need be added to the system. Hydrated ferric chloride can thus be made of any degree of concentration without evaporation of either ferrous or ferric chloride solutions, and this is of decided advantage because of difficulties of concentrating either ferrous or ferric chloride by evaporation of water from solutions thereof.

The complete elimination of the evaporation step in order to obtain desired or high concentrations of the ferric chloride effects a substantial economy, not alone from the saving of fuel or source of heat, but also by reason of the complete elimination of kettles, evaporators and other containers in which such evaporation would normally be carried out. The evaporation of ferric chloride is quite destructive of apparatus, and hence a saving in maintenance costs is also possible with this process.

I claim as my invention:

1. A process of making hydrated ferric chloride of at least approximately 60% ferric chloride which comprises circulating a solution of ferric chloride continuously in a closed path, bringing said circulating solution in one zone of its path into physical contact with metallic iron by which a portion of the ferric chloride is converted into ferrous chloride, subjecting the circulating solution to the action of chlorine gas while in another and separate zone of its path to convert ferrous chloride into ferric chloride, and continuing the circulation in said path when the ferric chloride solution attains a concentration of about 60%.

2. A process of making hydrated ferric chloride of at least approximately 60% ferric chloride which comprises circulating a solution of ferric chloride continuously in a closed path, bringing said circulating solution in one zone of its path into physical contact with metallic iron by which a portion of the ferric chloride is converted into ferrous chloride, subjecting the circulating solution to the action of chlorine gas while in another and separate zone of its path to convert ferrous chloride into ferric chloride, adding water to the solution while in said closed path to increase the quantity of solution in the process, limiting the amount of water supplied to said solution when approximately the desired quantity of solution has been produced, and continuing the circulation of said solution in said path when the same reaches a concentration of about at least 60% ferric chloride, until the desired concentration of the solution is attained.

3. A process of making hydrated ferric chloride of at least approximately 60% ferric chloride which comprises circulating a solution of ferric chloride continuously in a closed path, bringing said circulating solution in one zone of its path into physical contact with metallic iron by which a portion of the ferric chloride is converted into ferrous chloride, subjecting the circulating solution to the action of chlorine gas while in another and separate zone of its path to convert ferrous chloride into ferric chloride, continuing the circulation in said path after a concentration of about 60% ferric chloride is attained, until the solution attains the desired concentration, withdrawing a portion of the solution from said closed path after treatment of the same with chlorine, and continuing the circulation of another portion of the solution in said path into contact with iron.

4. A process of making hydrated ferric chloride of at least approximately 60% ferric chloride which comprises circulating a solution of ferric chloride continuously in a closed path, bringing said circulating solution in one zone of its path into physical contact with metallic iron by which a portion of the ferric chloride is converted into ferrous chloride, subjecting the circulating solution to the action of chlorine gas while in another separate zone of its path to convert ferrous chloride into ferric chloride, continuing the circulation in said path after a concentration of about 60% ferric chloride is attained, until the solution attains the desired concentration, withdrawing a portion of the solution to a container free from iron, subjecting the last mentioned portion of the solution to the action of an excess quantity of chlorine gas, and returning the unused portion of said excess chlorine gas from said other container into the chlorinating zone of said closed path.

5. A process of making hydrated ferric chloride of at least approximately 60% ferric chloride which comprises circulating a solution of ferric chloride continuously in a closed path, bringing said circulating solution in one zone of its path into physical contact with metallic iron by which a portion of the ferric chloride is converted into ferrous chloride, subjecting the circulating solution to the action of chlorine gas while in another and separate zone of its path to convert ferrous chloride into ferric chloride, continuing the circulation in said path after a concentration of about 60% ferric chloride is attained, until the solution attains the desired concentration, withdrawing a portion of the solution from said closed path after treatment of the same with chlorine, continuing the circulation of another portion of the solution in said path into contact with iron, and adding water to said last mentioned portion of said solution.

6. The process of making hydrated ferric chloride, which comprises circulating a solution of ferric chloride continuously in a closed path, bringing said circulating solution in one zone of its path into physical contact with metallic iron by which a portion of the ferric chloride is converted into ferrous chloride, chlorinating the circulating mixture of ferric and ferrous chloride while in another and separate zone of its path, whereby the ferrous chloride is converted into ferric chloride, and continuing the circulation of the solution after the same attains a concentration of at least about 60% ferric chloride until the desired concentration of ferric chloride is attained.

EDWARD THORNDIKE LADD.